(12) United States Patent
Orii

(10) Patent No.: US 9,361,138 B2
(45) Date of Patent: Jun. 7, 2016

(54) PERIPHERAL DEVICE, METHOD OF CONTROLLING PERIPHERAL DEVICE, FIRMWARE DOWNLOAD SYSTEM AND PROGRAM

(71) Applicant: Nidec Sankyo Corporation, Suwa-gun, Nagano (JP)

(72) Inventor: Tsutomu Orii, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/409,761

(22) PCT Filed: Oct. 11, 2013

(86) PCT No.: PCT/JP2013/077702
§ 371 (c)(1),
(2) Date: Dec. 19, 2014

(87) PCT Pub. No.: WO2014/103473
PCT Pub. Date: Jul. 3, 2014

(65) Prior Publication Data
US 2015/0293770 A1    Oct. 15, 2015

(30) Foreign Application Priority Data
Dec. 27, 2012   (JP) ................................. 2012-285599

(51) Int. Cl.
*G06F 3/00* (2006.01)
*G06F 9/445* (2006.01)
(Continued)

(52) U.S. Cl.
CPC .............. *G06F 9/44536* (2013.01); *G06F 8/71* (2013.01); *G06F 11/004* (2013.01); *G06F 12/0653* (2013.01); *G06F 13/122* (2013.01); *G06F 2212/1044* (2013.01)

(58) Field of Classification Search
CPC ....................................................... G06F 11/00
USPC ................................................................. 710/9
See application file for complete search history.

(56) References Cited

U.S. PATENT DOCUMENTS

| 6,930,785 | B1 * | 8/2005 | Weyand | ................ G06F 3/1204 358/1.1 |
| 7,146,412 | B2 * | 12/2006 | Turnbull | .................. G06F 8/65 709/206 |

(Continued)

FOREIGN PATENT DOCUMENTS

| JP | 09223075 A | 8/1997 |
| JP | 2004013782 A | 1/2004 |

(Continued)

OTHER PUBLICATIONS

International Search Report for International Application No. PCT/JP2013/077702; Date of Mailing: Jan. 4, 2014, with English translation.

*Primary Examiner* — Titus Wong
(74) *Attorney, Agent, or Firm* — Cantor Colburn LLP

(57) ABSTRACT

A peripheral may include an identification information storage unit in which identification information of a download file can be stored; a program storage unit in which at least program data is stored and is overwritable; and a controller which controls overwriting of the program data. The download file may include at least the identification information or both the identification information and overwrite permission data. When said overwrite permission data is included, the controller may overwrite the program data with program data sent from the host device and return a response indicating a normal completion of data overwrite. When overwrite permission is not included in the download file, the controller may return a response of a normal completion of said data overwrite without overwriting said program data. The identification information of the download file may be stored in the identification information storage unit.

13 Claims, 9 Drawing Sheets

(51) Int. Cl.
*G06F 11/00* (2006.01)
*G06F 9/44* (2006.01)
*G06F 12/06* (2006.01)
*G06F 13/12* (2006.01)

(56) References Cited

U.S. PATENT DOCUMENTS

| | | | | |
|---|---|---|---|---|
| 7,770,165 B2 * | 8/2010 | Olson | ............... | G06F 8/68 |
| | | | | 709/203 |
| 8,122,447 B2 * | 2/2012 | Cohen | ............... | G06F 8/65 |
| | | | | 717/169 |
| 8,713,559 B2 * | 4/2014 | Fallon | ............... | G06F 8/65 |
| | | | | 717/168 |
| 8,745,614 B2 * | 6/2014 | Banerjee | ............... | G06F 8/665 |
| | | | | 717/168 |
| 2003/0217357 A1 * | 11/2003 | Parry | ............... | G06F 8/65 |
| | | | | 717/168 |
| 2005/0027807 A1 * | 2/2005 | Fengler | ............... | G06F 8/60 |
| | | | | 709/206 |

FOREIGN PATENT DOCUMENTS

| JP | 2004259224 A | 9/2004 |
|---|---|---|
| JP | 2007293514 A | 11/2007 |

* cited by examiner

23 : DOWNLOAD FILE
231 : PROGRAM DATA
232 : REVISION INFORMATION (REVISION HEADER)
233 : ERASE COMMAND
234 : DOWNLOAD COMMAND
235 : END OF FILE (EOF)
236 : OVERWRITE PERMISSION DATA
237 : IDENTIFICATION INFORMATION (ID FOR IDENTIFICATION)

238 : CERTIFY-OVERWRITING COMMAND

PERIPHERAL DEVICE, METHOD OF CONTROLLING PERIPHERAL DEVICE, FIRMWARE DOWNLOAD SYSTEM AND PROGRAM

CROSS REFERENCE TO RELATED APPLICATIONS

This is the U.S. national stage of application No. PCT/JP2013/077702 filed on Oct. 11, 2013. Priority under 35 U.S.C. §119(a) and 35 U.S.C. §365(b) is claimed from Japanese Application No. 2012-285599, filed Dec. 27, 2012 the disclosure of which is also incorporated herein by reference.

FIELD OF THE INVENTION

At least an embodiment of present invention relates to a peripheral device which is connected to a host device and to which firmware program data to operate the peripheral device can be downloaded from the host device. Also, at least an embodiment of the present invention relates to a method of controlling the peripheral device, a firmware download system equipped with the host device to which the peripheral device can be connected, and a computer program.

BACKGROUND

A firmware download method has been proposed for downloading firmware program data from a host device to a card reader (Patent reference 1, for example).

According to the download method disclosed in Patent reference 1, a download file including the program data is stored in a host device; when the revision information of the download file saved in the host device doesn't match a response from the card reader to a get-revision-information command issued by the host device, the program data is downloaded from the host device to the card reader.

PATENT REFERENCE

[Patent Reference 1] Unexamined Japanese Patent Application 2004-13782 Publication A card reader of an old version which is connected to a host device often needs to be replaced by a new version in order to improve the function thereof or to deal with discontinuation of the parts.

However, it is not guaranteed that the firmware program data saved in the host device corresponds to a card reader of a new version. For example, there is a case that when the firmware program data saved in a host device is the program data that supports the card reader of an old version, a card reader of a new version may be connected to the host device.

If the program data is downloaded by the download method disclosed in Patent reference 1 when a card reader of a new version is connected to a host device and the firmware program data supporting a card reader of an old version is saved in the host device, the program data supporting the old version card reader may be downloaded to the new version card reader. In other words, depending on the program data saved in a host device, the program data supporting an old version card reader may be downloaded to a new version card reader which is manufactured to improve the functions or to cope with the discontinuation of the parts in use.

Consequently, although the card reader connected to the host device is replaced by a new version, the function of the card reader may not be improved or the purpose of dealing with discontinuation of the parts may be not achieved. Also, if the program data corresponding to the old version card reader is downloaded to a new version card reader, the new version card reader may not run properly.

To prevent the program data corresponding to the old version card reader from being downloaded to the new version card reader, the new version card reader can just reject the download of the program data corresponding to the old version card reader if the program data corresponding to the old version card reader is saved in the host device. In other words, the new version card reader may return a download-rejecting response to the download-program-data command from the host device.

However, if the new version card reader replies with the download-rejecting response, the download process by the host device cannot properly be ended and the system including the host device may crash. In other words, the entire operation of the system may stop.

SUMMARY

At least an embodiment of the present invention provides a peripheral device, a method of controlling the peripheral device, a firmware download system and a computer program, which prevent the program data corresponding to a peripheral device of an old version from being download from a host device to prevent the system including the peripheral device from crashing.

At least an embodiment of the present invention provides a peripheral device which is connected to a host device and to which a download file including the program data of a firmware to operate the peripheral device can be downloaded from the host device, comprising an identification information storage unit for storing the identification information of the download file, a program storage unit for storing at least the program data as over-writable, and a controller for controlling the overwrite of the program data stored in the program storage unit; wherein the download file includes at least the identification information of the download file or both the identification information of the download file and the overwrite permission data which allows the controller to overwrite the program data stored in said program storage unit; when the overwrite permission data is included in the download file, the controller overwrites the program data saved in the program storage unit with the program data sent from said host device as a normal overwrite and returns a response indicating a normal completion of the data overwrite; when the overwrite permission is not included in the download file, the controller, as a pseudo-overwrite, returns a response of a normal completion of the data overwrite without overwriting the program data stored in the program storage unit with the program data sent from the host device; and the identification information of the download file is stored in the identification information storage unit.

At least an embodiment of the present invention provides a method of controlling a periphery device which is connected to a host device and to which a download file including the program data of a firmware to operate the peripheral device can be downloaded from the host device, comprising an overwrite permission judging step in which it is judged whether or not the overwrite permission data, which allows the program data saved in the host device to overwrite the program data saved in the peripheral device, is included in the download file downloaded from the host device, a normal overwriting step in which, when it is judged in the overwrite permission judging step that the overwrite permission data is included in the download file, the program data saved in the peripheral device is overwritten with the program data sent from the host device and a response indicating a normal completion of the data overwrite is sent to the host device, a pseudo-overwriting step in which, when it is judged in the overwrite permission judging step that the overwrite permission data is not included in the download file, a response of a normal completion of the data overwrite is sent to the host device without overwriting the program data saved in the peripheral device with the program data sent from the host device, an identification information storing step in which the identification information of the download file included in the download file is stored in the identification information storage unit of the peripheral device, and an identification information sending step in which the identification information stored in the identification information storage unit is sent to the host device when a request is received from the host device to send the identification information.

A firmware download system of at least an embodiment of the present invention comprises at least one peripheral device and a host device to which the peripheral is connected and from which a download file including the program data of a firmware, which operate the peripheral device, can be downloaded to the peripheral device; the peripheral device is configured at least by the above-mentioned peripheral device.

A program of a controller which controls a peripheral device, to which a file including program data can be downloaded from a host device, comprises an overwrite permission judging process in which it is judged whether or not the overwrite permission data to allow the program data stored in the host device to overwrite the program data stored in the peripheral device is included in the file downloaded from the host device, a normal overwriting process in which, when it is judged in the overwrite permission judging process that the overwrite permission data is included in the download file, the program data sent from the host device overwrites the program data stored in the peripheral device and a response indicating a normal completion of the data overwrite is sent to the host device, a pseudo-overwriting process in which, when it is judged in the overwrite permission judging process that the overwrite permission data is not included in the download file, a response of a normal completion of the data overwrite is sent to the host device without overwriting the program data stored in the peripheral device with the program data sent from the host device, an identification information storing process in which the identification information of the download file included in the download file is stored in the identification information storage unit of the peripheral device, and an identification information sending process in which, when a request is received from the host device to send the identification information, the identification information stored in the identification information storage unit is sent to the host device.

According to at least an embodiment of the present invention, the program data corresponding to a peripheral device of an old version is prevented from being downloaded from a host device to prevent a system, including a peripheral device of a new version, from crashing.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention are described hereinafter associating with the drawings.

<Configuration of a Firmware Download System>

Figure 1:
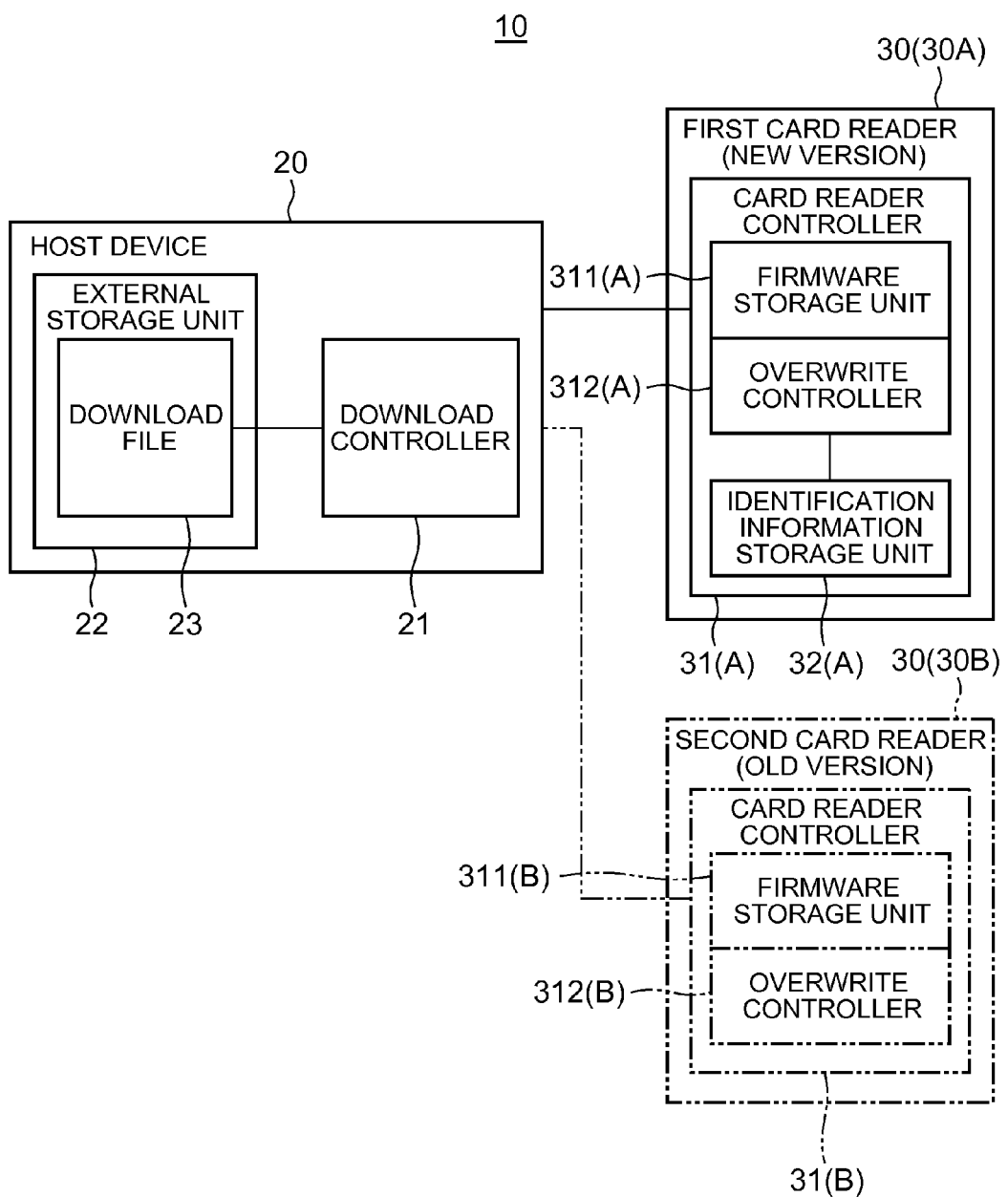
[FIG. 1] A block diagram showing a configuration of a firmware download system of an embodiment of the present invention.
Figure 2:
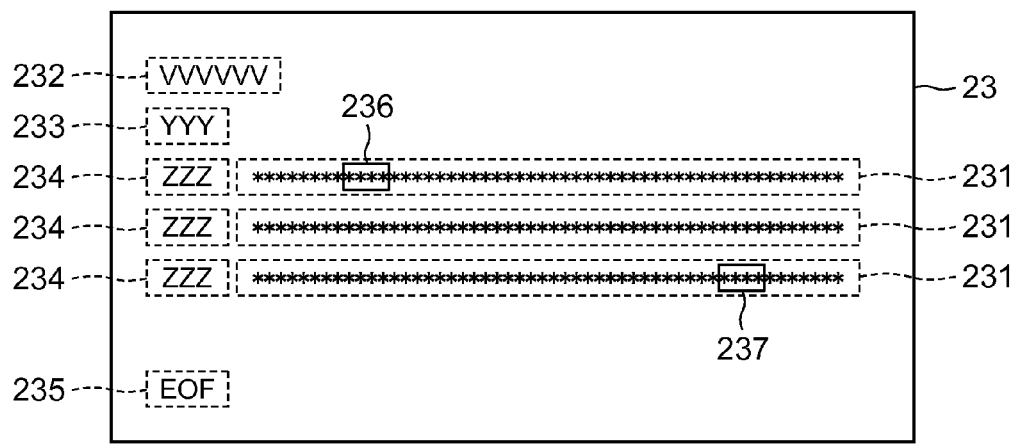
[FIG. 2] A configuration diagram showing an example of a data structure of download files saved in a host device shown in FIG. 1.
Figure 3A:
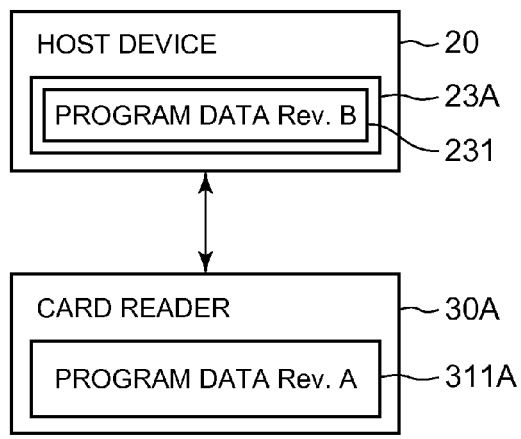
[FIG. 3] A configuration diagram to explain combination patterns between a card reader connected to the host device of FIG. 1 and the download file stored in the host device.
Figure 3B:
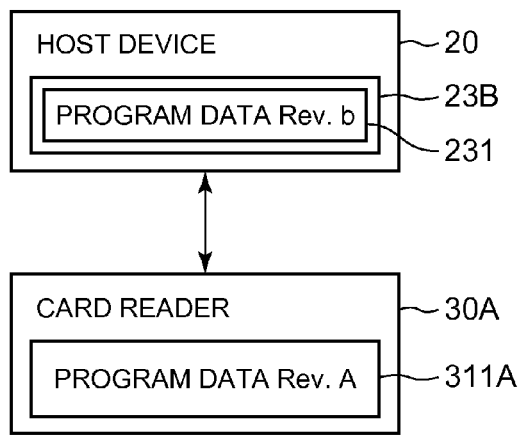
Figure 3C:
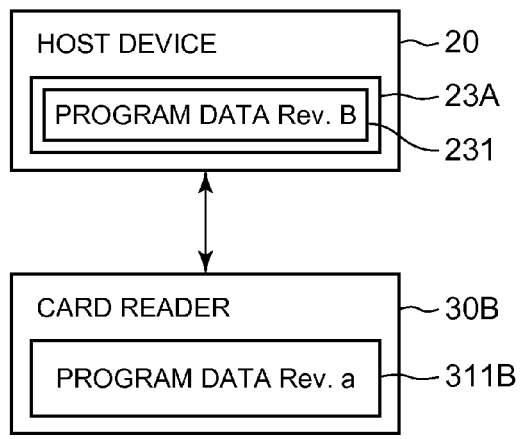
Figure 3D:
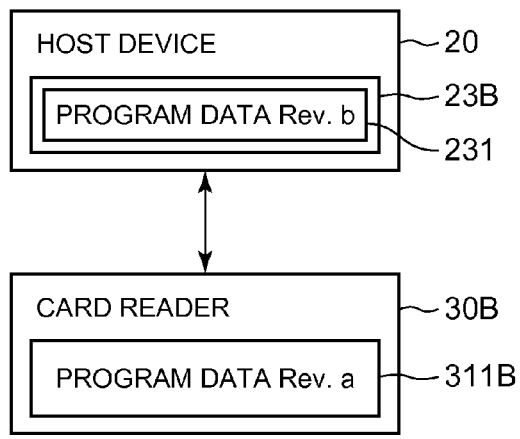

FIG. 1 is a block diagram showing the configuration of a firmware download system 10 of an embodiment of the present invention. FIG. 2 is a configuration diagram showing an example of a data structure of a download file saved in a host device 20 shown in FIG. 1. FIG. 3 is a configuration diagram to explain combination patterns between a card reader 30 connected to the host device 20 of FIG. 1 and the download file saved in the host device 20.

A firmware download system 10 of this embodiment (hereinafter denoted to "download system 10") has a host device 20 such as a host computer and a card reader 30 (30A, 30B) as a peripheral device which is communicably connected with the host device 20, as shown in FIG. 1. The host device 20 and the card reader 30 are communicably connected to each other through a communication interface such as RS232 or USB (Universal Serial Bus). The download system 10 downloads firmware program data 231 (referring to FIG. 2), which operates the card reader 30 as a peripheral device, from the host device 20 to the card reader 30.

In the download system 10 of this embodiment, for instance, a first card reader 30A which is a card reader of a new version manufactured to improve the functions and cope with discontinuation of the parts (used in an old version card reader), and a second card reader 30B which is a card reader of an older version 30 which is manufactured earlier than the first card reader 30A can be connected to the host device 20. In this embodiment, only either the first card reader 30A or the second card reader 30B is connected to the host device 20. The first card reader 30A of this embodiment corresponds to a peripheral device (the first peripheral device) and the second card reader 30B corresponds to a second peripheral device.

[Configuration Example of Host Device]

The host device 20 is configured by a download controller 21 and an external storage unit 22 such as a hard disk drive. The download controller 21 includes a communication function part and a control program. The download controller 21 controls the download of the program data 231 (FIG. 2) to the card reader 30.

Also, in the external storage unit 22, a download file 23 including the program data 231 is saved.

In this embodiment, for instance, either the download file 23A (referring to FIGS. 3 (A) and (C)) including the program data 231 which supports the first card reader 30A or a download file 23B (referring to FIGS. 3 (B) and (D)) including the program data 231 which supports the second card reader 30B is saved in the external storage unit 22 of the host device 20.

<Configuration Example of Download File>

The configuration example of the download file 23 of this embodiment is described referring to FIG. 2.

As the example of FIG. 2, the download file 23 has revision information (a revision header) 232 on the first line, an erase command 233 on the second line, a download command 234 placed at the beginning of the program data 231 on each line after the third line, and an EOF (End Of File mark, a file terminal code) 235 on the last line written in addition to the program data 231.

In other words, in the example of FIG. 2, the revision information 232 is written on the first line of the download file 23, the erase command 233 is written on the second line of the download file 23. The download command 234 and the program data 231 are both written on the third and further lines of the download file 23, and the EOF 235 is written on the last line of the download file 23.

The revision information 232 is the revision information of the program data 231 in the download file 23. The format of the revision information 232 is the same format as the response from the card reader 30 obtained when the host device 20 issues a get-program-data-revision command to the card reader 30. The get-revision command is a command to obtain the revision information of the program data stored in the card reader 30.

Note that the revision information (the revision header) 232 in the beginning line (first line) in the download file 23 is for the host device, and therefore, is not sent to the card reader 30.

The erase command 233 is a command to erase the specific area in the firmware storage unit which is a program storage unit of the card reader 30, described later.

The program data 231 on each of the third and further lines in the download file 23 is formatted in a regular data format and by a data length which are suitable to a communication protocol between the host device 20 and the card reader 30, and also paired with the download command 234.

In the example of FIG. 2, for instance, the overwrite permission data 236 to allow the overwrite in the card reader 30, to which the program data is downloaded, is written in the program data 231 on the third line (the first program data).

In this embodiment, written in the program data 231 on the third line of the download file 23A which includes the program data 231 corresponding to the first card reader 30A, for example, is the overwrite permission data 236 which lets the overwrite controller in the card reader allow the program data 231 of the download file 23A stored in the external storage unit 22 to overwrite the program data stored in the card reader 30A. On the other hand, the overwrite permission data 236 is not written in the program data 231 on the third line in the download file 23B which includes the program data 231 corresponding to the second card reader 30B.

Note that the overwrite permission data 236 may be written in the program data 231 either in cipher text or in plain text.

In the example of FIG. 2, further, the identification information (the identification ID) 237 of the file 23 to be downloaded is written in the program data 231 on the fifth line (in the third program data). Note that the identification information 237 may be written in the program data 231 either in cipher text or in plain text.

In this embodiment, the revision information (the revision header) 232 and the identification information (the identification ID) use the same data.

FIG. 2 is a mere example; the overwrite permission data 236 and the identification information 237 written in the program data 231 can be placed anywhere (in the program data 231) as long as they are at predetermined locations, but it is preferred that they be placed in the beginning area of the program data 231 so that the host device 20 and the card reader 30 can recognize and obtain them at the early download stage.

In this embodiment, for downloading the program data 231 from the host device 20 to the card reader 30, the download controller 21 executes the download process when the revision information 232 retrieved from the first line of the download file 23 doesn't match the revision of the program data in the card reader 30 which was received as a response to the get-revision command. Then, the download controller 21 checks if the card reader 30 has moved to the download mode; when confirmed, the download controller 21 reads the download file 23 line by line from the second line and releases (issues) each read line as a command to the card reader 30.

If the second line of the download file 23 is read, for example, the download controller 21 issues an erase command 233 to the card reader 30. Also, if the third or later line of the download file 23 is read, the download controller 21 issues a download command 234 together with the formatted program data to the card reader 30. The download controller 21 judges whether or not the command is normally executed based on the response from the card reader 30, according to the presence or absence of the response indicating a normal completion.

The application related to the downloads of the write permission data 236 and the identification information 237 is described later.

Also, the download controller 21 of this embodiment has a function to issue the revision information (the revision header) on the first line as a command and to send it as a send-identification-information (the identification ID) command depending on the situation. In this embodiment, the identification information (ID for identification) is placed in a predetermined location in the program data 231 in the download file; however, it is not always positioned in the same location throughout other peripheral devices. Therefore, it is possible that the identification information (the identification ID) which is not sent to the peripheral device in the current situation is written in a text format and a notify-identification-ID command is newly provided. Only when the download controller 21 normally receives this (notify-identification-ID) command, the process to create such a send-(identification-ID) command using the notify-command is performed to realize the certification.

[Example of Configuration of Card Reader (Peripheral Device)]

The card reader 30 is configured by a manual card reader which reads magnetic data recorded on a card as the card is manually moved or a card-transfer type card reader which reads magnetic data recorded on a card as the card is transferred by a card transfer mechanism.

The card reader 30 primarily has a card reader controller 31 and an identification information storage unit 32 as major components. The card reader controller 31 is configured including a memory means such as a ROM, a RAM and a non-volatile memory and a computation means such as a CPU, to control the entire operations of the card reader 30. The card reader controller 31, as shown in FIG. 1, has a firmware storage unit 311 as a program storage unit and an overwrite controller 312. The firmware storage unit 311 stores (saves) firmware that includes the program data. The firmware storage unit 311 is configured by a memory or the like and stores (saves) the program data as over-writable. Also, the firmware storage unit 311 stores (saves) the revision information of the stored program data. The overwrite controller 312 controls the overwrite of the program data stored in the firmware storage portion 311. The identification information storage unit 32 is arranged such that it is included in the card reader controller 31, and stores the identification information written in the download file 23 as erasable under the control of the card reader controller 31, which is the overwrite controller 312 in this embodiment. This control is described later.

The above is an example of the basic configuration of the card reader 30; both a first card reader 30A which is a new version and a second card reader 30B which is an old version are also configured in the same manner, having the same functions, basically. Note that the identification information storage unit 32 is not arranged in the old-version, second card reader 30B.

In other words, the card reader 30A has a card reader controller 31A and an identification information storage unit 32A as major components. The card reader 31A is configured including a memory means such as a ROM, a RAM and a non-volatile memory and a computation means such as a CPU, and controls the entire operations of the card reader 30A. The card reader controller 31A, as shown in FIG. 1, has a firmware storage unit 311A as a program storage unit and an overwrite controller 312A. The firmware storage portion 311A stores (saves) a firmware which includes the program data. The firmware storage unit 311A is configured by a memory or the like and stores (saves) the program data as over-writable. The firmware storage unit 311A also stores (saves) the revision information of the stored program data. The overwrite controller 312A controls the overwrite of the program data stored in the firmware storage unit 311A. The identification information storage unit 32A is arranged such that it is included in the card reader controller 31A, and stores the identification information written in the download file 23 as erasable under the control of the card reader controller 31A, which is the overwrite controller 312A in this embodiment.

In the same manner, the card reader 30B has a card reader controller 31B as a primary component. The card reader controller 31B is configured by a memory means such as a ROM, a RAM and a non-volatile memory and a computation means such as a CPU, and controls the entire operations of the card reader 30B. The card reader controller 31B, as shown in FIG. 1, has a firmware storage unit 311B as a program storage unit and a overwrite controller 312B. The firmware storage unit 311B stores (saves) the firmware which includes the program data. The firmware storage unit 311B is configured by a memory or the like and stores (saves) the program data as over-writable. Also, the firmware storage unit 311B stores (saves) the revision information of the stored program data. The overwrite controller 312B controls the overwrite of the program data stored in the firmware storage unit 311B.

Note that the identification information storage unit 32(A) in which the identification information 237 is stored is configured by a non-volatile memory such as a flush memory. In the example of FIG. 1, the firmware storage unit 311 (A, B) is included in the card reader controller 31(A, B); however, the configuration is not limited to the example of FIG. 1, but can be any as long as the firmware storage unit 311(A, B) is controlled by the overwrite controller 312 of the card reader controller 31 (A, B). Also, the controller of this embodiment is configured at least by the card reader controller 31(A) or the overwrite controller 312(A) or by both.

A control process of downloading a download file in the card reader 30 of this embodiment is described next.

The card reader controller 31 of the card reader 30 performs the following process when the overwrite permission data 236, which allows the overwrite controller 312 to overwrite the program data stored in the firmware storage unit 311, is included in the file 23 downloaded from the host device 20. At this time, the card reader controller 31 overwrites the program data stored in the firmware storage unit 311, which is a program storage unit, with the program data 231 sent from the host device 20 as a normal overwrite, and sends to the host device 20 a response indicating a normal completion of the data overwrite.

The card reader controller 31 performs the following process when the overwrite permission data is not included in the file 23 downloaded from the host device 20. At this time, as a pseudo-overwrite, the card reader controller 31 does not overwrite the program data stored in the firmware storage unit 311, which is a program storage unit, with the program data sent from the host device 20, but sends to the host device a response indicating a normal completion of the data overwrite.

Parallel to the overwrite process, the card reader controller 31 obtains (retrieves) the identification information 237 written in the download file 23 which is received and stores it in the identification information storage unit 32.

In this embodiment, the card reader controller 31 obtains the identification information 237 included in the download file 23 and stores it in the identification information storage unit 32 at the time of pseudo-overwrite. Then, the card reader controller 31 returns the identification information, which is stored in the identification information storage unit 32, to the host device 20 when receiving a request from the host device 20 to send the identification information.

In this embodiment, also, the card reader controller 31 erases the identification information stored in the identification information storage unit 32 at the time of the above mentioned normal overwrite if the file 23 downloaded from the host device 20 is normally received. Note that it is an example to erase the identification information stored in the identification information storage unit 32 when the file 23 downloaded from the host device 20 is normally received. At this time, various methods, besides erasing, such as prohibiting later access to the identification information storing area can be used as long as the obtaining (reading) of the identification information stored in the identification information storage 32 is disabled. When performing a normal overwrite, the card reader controller 31 returns the valid (normal) identification information to the host device 20 when receiving a request from the host device 20 to sent the identification information.

In other words, in the card reader 30 of this embodiment, the card reader controller 31 performs the following controls at the time of downloading the download file.

(1) When receiving an old-version download file, which is downloadable, the controller 31 not only returns to the host device 20 a pseudo-response indicating that the command has normally been received, but also retrieves (obtains) the invalidated identification information 237 from the received data and holds it in the identification information storage unit 32 such as a non-volatile memory in the card reader 30, which is a peripheral device.

When the invalidated identification information is saved in the identification information storage unit 32, this is sent as the identification information, responding to the request.

(2) When normally receiving a new-version download file, the storage area in the identification information storage unit 32 storing the invalidated identification information is erased. In other words, if the storage area storing the invalidated identification information has already been erased at the time of start-up, the normal identification information is sent, responding to the request.

(3) When the identification information is not present in the predetermined location in the received download file 23, the identification information of the download file 23 which the host device 20 can recognize is sent through a new send-command to the card reader 30 which is a peripheral device. The card reader 30 stores (saves) and holds the identification information, which was received through the new command, in the identification information storage unit 32 such as a non-volatile memory.

<More Concrete Download Control Process in Card Reader 30>

[Normal Process, but not this Embodiment]

Normally, the overwrite area in the firmware storage unit 311 in which the program data is stored is erased upon receiving the "erase" command, and the writing is performed upon receiving the "download" command.

Process of this Embodiment

In this embodiment, the following processes (1) through (5) are performed.

(1) When the "erase" command is received, the overwrite area in the firmware storage unit 311 in which the program data is stored is not erased; but when the first "download" command is received, a judgment is made referring to the overwrite permission data (the certification ID data) 236 included in the program data 231 that follows the download command. When the validity of the program data 231 (in case of normal overwrite) is confirmed, the program data in the overwrite area in the firmware storage unit 311 and the identification information in the identification information storage unit 32 such as a non-volatile memory is erased, and the program data that follows the first "download" command is written in.

(2) When the validity is not confirmed through the judgment referring to the overwrite permission data (the certification ID data), the file is judged not to be the download file which should be used to overwrite; only a normal response is sent without the overwrite which the "erase" or "download" command allows. In other words, the processes to respond to those commands are not performed, but a pseudo-overwrite is performed.

(3) In the process of the pseudo-overwrite, the identification information (the identification ID) inherent in a predetermined location in the received download file 23 is obtained and temporarily held inside.

(4) The pseudo-overwrite process pretends that a normal download has been completed to the end. When the process comes to the end, the temporarily-held identification information (the identification ID) is stored (saved) in the identification information storage unit 32 such as a non-volatile memory.

(5) After the download, if the identification information (the identification ID) is recorded in the identification information storage unit 32 such as a non-volatile memory, the identification information (the identification ID) is sent as a response to the request from the host device 20 to send the identification information.

In this embodiment, thus, the download process using the identification information is performed to gain the following advantages. Even if the host device 20 is not updated with a new-version download file, not only is a pseudo-overwrite performed on the sent download file, but also the identification information (the identification ID) of the invalidated download file, on which the pseudo-overwrite is performed, is sent to the host device 20 when a request is received from the host device 20 to send the identification information (the identification ID); therefore, no further process is performed, thus shortening the process. When a request is received from the host device 20 to send the identification information (the identification ID), the identification information (the identification ID) of the pseudo-overwritten download file is returned even immediately after the download; therefore, a system crash can be avoided. The instruction of applying the download file which is actually inapplicable is removed from the host device 20; therefore, its operation environment is protected, enabling continual use.

<Combinations Between Card Reader 30 Connected to Host Device 20 and Download File 23 Saved in Host Device 20>

In this embodiment, by the way, the first card reader 30A and the second card reader 30B can be connected to the host device 20 as described above. Also, saved in the external storage unit 22 is a download file 23A including the program data 231 which corresponds to the first card reader 30A or a download file 23B including the program data 231 which corresponds to the second card reader 30B. Therefore, there are four possible patterns as shown in FIG. 3 for the combinations between the card reader 30 connected to the host device 20 and the download file 23 saved in the host device 20.

In other words, FIG. 3 (A) shows a combination in which the first card reader 30A is connected to the host device 20 and the download file 23A is saved in the external storage unit 22. FIG. 3 (B) show a combination in which the first card reader 30A is connected to the host device 20 and the download file 23B is saved in the external storage unit 22. FIG. 3 (C) shows a combination in which the second card reader 30B is connected to the host device 20 and the download file 23A is saved in the external storage unit 22. Finally, FIG. 3 (D) shows a combination in which the second card reader 30B is connected to the host device 20 and the download file 23B is saved in the external storage unit 22.

Note that, when the download file 23A is saved in the external storage unit 22, the revision (header) of the program data 231 included in the download file 23A is indicated as "Rev. B" as shown in FIGS. 3 (A) and (C). Also, when the download file 23B is saved in the external storage unit 22, the revision (header) of the program data 231 included in the download file 23B is indicated as "Rev. b" as shown in FIGS. 3 (B) and (D). Also, the revision (header) of the program data saved in the firmware storage unit 311A of the first card reader 30A is indicated as "Rev. A" as shown in FIGS. 3 (A) and (B). The revision (header) of the program data saved in the firmware storage unit 311B of the second card reader 30B is indicated as "Rev. a" as shown in FIGS. 3 (C) and (D), for example.

In this embodiment, even if the program data 231 which corresponds to the first card reader 30A is downloaded to the second card reader 30B, the second card reader 30B continues a normal operation. On the other hand, if the program data 231 which corresponds to the second card reader 30B is downloaded to the first card reader 30A, the first card reader 30A stops operating normally.

The firmware download process of this embodiment is described hereinafter dividing it into the process at the host device 20 and the process at the card reader 30 which is a peripheral device.

<Firmware Download Process: Process at Host Device>

Figure 4:
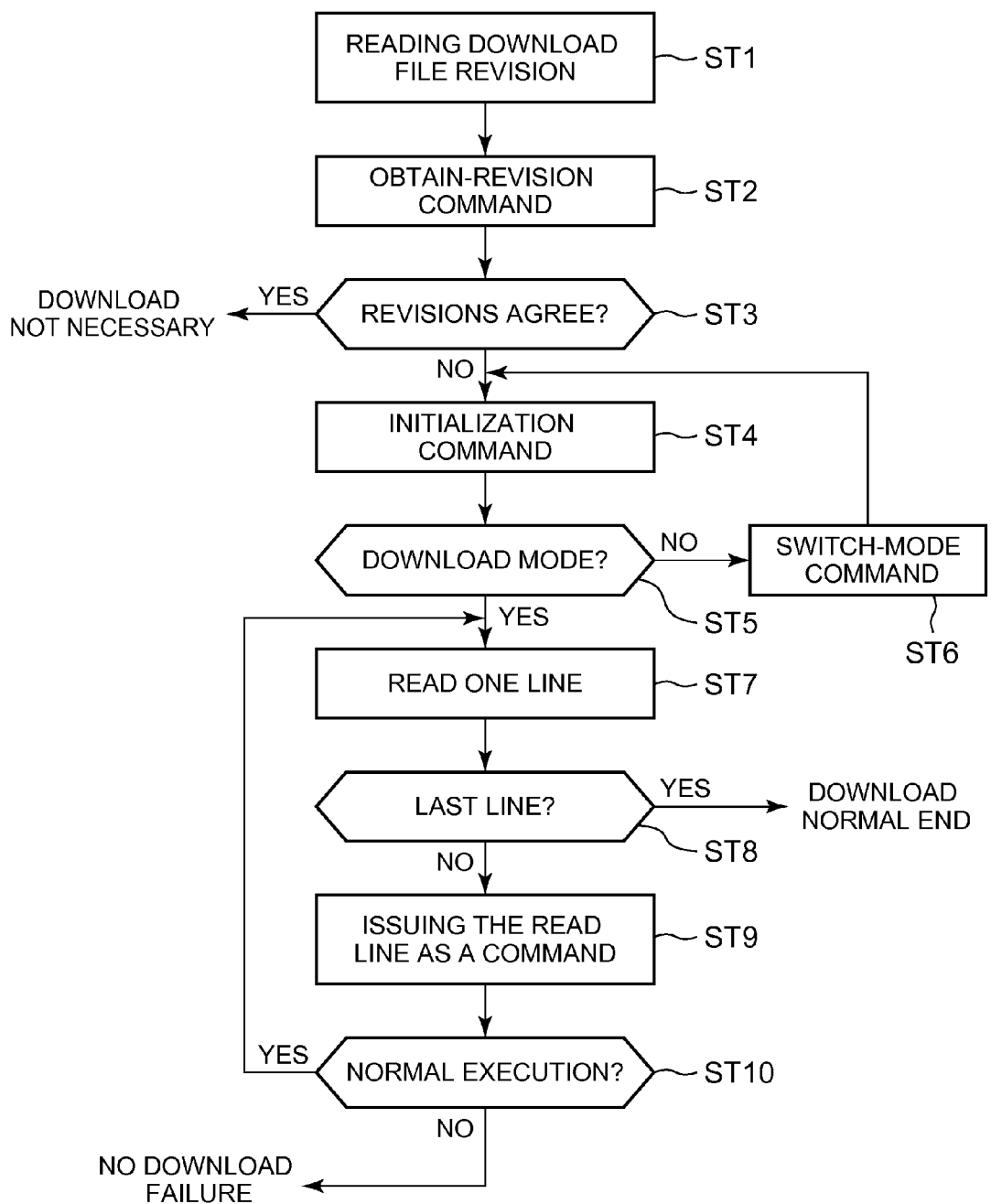
[FIG. 4] A flowchart showing an example of the process flow of a firmware download at the host device of FIG. 1.

The download process at the host device 20 is first described referring to FIG. 4.

FIG. 4 is a flowchart of an example of the process flow during the firmware download.

To download the program data 231 from the host device 20 to the card reader 30, the download controller 21 first reads the first line of the download file 23 to read the revision information 232 (Step ST1) and issues a get-revision-(information) command to the card reader 30 (Step ST2). Then, the download controller 21 compares the revision information 232 read from the download file 23 with the response from the card reader 30 to the get-revision-(information) command (Step ST3). In other words, in Step ST3, the revision (information) of the program data 231 included in the download file 23 which is saved in the host device 20 (more specifically, in the external storage unit 22) is compared with the revision (information) of the program data saved in the firmware storage unit 311 of the card reader 30.

When the revision (information) of the program data 231 included in the download file 23 which is saved in the host device 20 does not match the revision (information) of the program data saved in the firmware storage portion 311 (A, B) in Step ST3 ("No" in Step ST3), the download controller 21 issues an initialization command to the card reader 30 to execute a download process (Step ST4).

In other words, when the revision (information) of the program data 231 included in the download file 23A which is saved in the host device 20 (more specifically, the external storage unit 22) is "Rev. B" and the revision (information) of the program data saved in the firmware storage portion 311A is "Rev. A" as shown in FIG. 3 (A), the download controller 21 issues an initialization command. When the revision (information) of the program data 231 included in the download file 23B which is saved in the host device 20 is "Rev. b" and the revision (information) of the program data saved in the firmware storage portion 311A is "Rev. A" as shown in FIG. 3 (B), the download controller 21 also issues an initialization command. When the revision (information) of the program data 231 included in the download file 23A which is saved in the host device 20 is "Rev. B" and the revision of the program data saved in the firmware storage unit 311B is "Rev. a" as shown in FIG. 3 (C), the download controller 21 issues an initialization command.

When the revision (information) of the program data 231 included in the download file 23B which is saved in the host device 20 is "Rev. b" and the revision (information) of the program data saved in the firmware storage unit 311B is "Rev. a" as shown in FIG. 3 (D), the download controller 21 issues an initialization command.

In the above-mentioned cases, the revision (information) of the program data 231 included in the download file 23 which is saved in the host device 20 does not match the revision (information) of the program data saved in the firmware storage unit 311 (A, B); therefore, the download controller 21 issues an initialization command to the card reader 30 in Step ST4.

After that, the download controller 21 judges from the response by the card reader 30 to the initialization command whether or not the card reader 30 is in a download mode ready for the download of the program data 231 (Step ST5). When it is found in ST5 that the card reader 30 is not in the download mode ("No" in Step ST5), the download controller 21 issues a switch-mode command to the card reader 30 (Step ST6) to let the card reader 30 change its mode to the download mode, and then returns to Step ST4.

On the other hand, when it is found in Step ST5 that the card reader 30 is in the download mode ("Yes" in Step ST5), the download controller 21 reads the second line and further of the download file 23 line by line (Step ST7), and judges whether or not the read line is the last line (EOF 235) (Step ST8).

When it is judged in Step ST8 that the read line is not the last line ("No" in Step ST8), the download controller 21 releases the read line of the download file 23 as a command to the card reader 30. For example, when the read line is the second line of the download file 23, the erase command 233 is issued to the card reader 30. Also, the read line is the third line or later in the download file 23, the program data 231 formatted as the download command 234 is issued to the card reader 30.

Then, the download controller 21 judges based on the response from the card reader 30 whether or not the command is normally executed (Step ST10). When the response from the card reader 30 is a normal response ("Yes" in Step ST10), the controller 21 makes the process return to Step ST7 and reads the next line of the download file 23. On the other hand, when the response from the card reader 30 is an abnormal response ("No" in Step ST10), the download controller 21 judges it a failure of downloading the program data 231, and therefore, ends the download processing. Note that, in this case, the download system 10 may crash (the download system 10 may stop operating).

When it is judged in Step ST8 that the line which is read from the download file 23 is the last line ("Yes" in Step ST8), the download of the program data 231 is normally completed.

When it is found in Step 3 that the revision (information) of the program data 231 saved in the host device 20 matches the revision (information) of the program data saved in the firmware storage unit 311 (A, B) ("Yes" in Step ST3), the download controller 21 judges that there is no need to download the program data 231 and ends the download process. For example, when the revision of the program data 231 saved in the host device 20 is "Rev. A" as shown in FIG. 3 (A), the revision (information) of the program data 231 saved in the host device 20 matches the revision (information) of the program data saved in the firmware storage unit 311A; therefore, the download controller 21 ends the download process.

<Firmware Download Process: Process at Card Reader>

Figure 5:
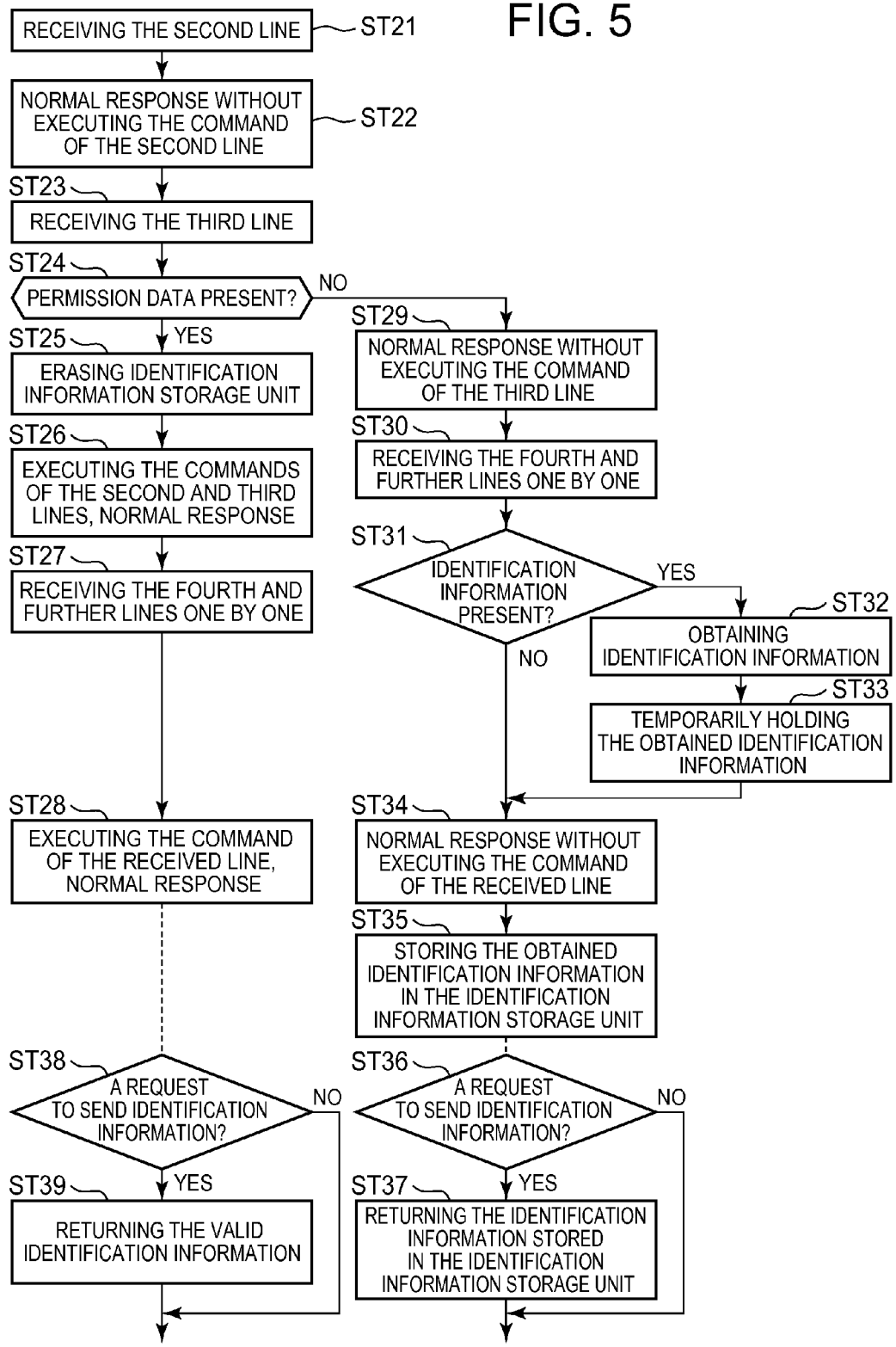
[FIG. 5] A flowchart of an example of a process flow of the firmware download at a card reader of FIG. 1.

Next, the download process at the card reader 30 which is a peripheral device of this embodiment is described associating with FIG. 5. FIG. 5 is a flowchart of an example of the process flow in the card reader 30 shown in FIG. 1 at the time of downloading the firmware.

As shown in FIGS. 3 (C) and (D), when the second card reader 30B is connected to the host device 20, no matter which download file, 23A or 23B, is saved in the host device 20, the second card reader 30B performs the process the same as a normal card reader process (described in Patent reference 1, for example), at the time of the firmware download.

In other words, if the line which is read in the above-described Step ST7 is the second line of the download file 23, the card reader controller 31B executes the erase command 233 based on the erase command issued in Step ST9. More specifically, the overwrite controller 312B erases the specified area in the firmware storage unit 311B. Even more specifically, the overwrite controller 312B erases the program data in the firmware storage unit 311B, which corresponds to the program data 231. Also, the card reader controller 31B sends to the download controller 21 a normal response indicating that the erase command 233 is normally executed.

If the line read in Step ST7 is the third line or later of the download file 23, the card reader controller 31B executes the download command 234 issued in Step ST9. More specifically, the overwrite controller 312B stores (saves) the program data 231 sent from the host device 20 in the specified area in the firmware storage unit 311B. In other words, the overwrite controller 312B writes the program data 231 sent from the host device 20 in the firmware storage unit 311B. Also, the overwrite controller 312B sends to the download controller 21 a normal response indicating that the download command 234 is normally executed.

On the other hand, as shown in FIGS. 3 (A) and (B), when the first card reader 30A is connected to the host device 20, a process different from the normal one (at the card reader described in the above-described Patent reference 1, for example) is performed at the first card reader 30A at the time of the firmware download. More specifically, the process is performed at the first card reader 30A as below, following the flow in FIG. 5.

The overwrite controller 312A receives the second line of the download file 23 which is read in the above-described Step ST7 and issued in Step ST9, i.e., the erase command 233 (Step ST21). The overwrite controller 312A does not execute the erase command 233 from the second line, but returns to the download controller 21 a normal response indicating (pretending) that the erase command 233 is normally executed (Step ST22). In other words, in Step ST22, the overwrite controller 312A returns to the download controller 21 a normal response indicating (pretending) that the erase command 233 is normally executed, without erasing the program data saved in the firmware storage unit 311A.

Then, the overwrite controller 312A receives the third line of the download file 23 issued (released) in Step ST9, which consists of the download command 234 and the program data 231 (Step ST23). The overwrite controller 312A judges whether or not the overwrite permission data 236 is written in the program data 231 from the third line. In other words, the overwrite controller 312A judges whether or not the program data 231 saved in the host device 20 is the program data 231 corresponding to the first card reader 30A in Step ST24.

When, as show in FIG. 3 (A), the download file 23A is saved in the host device 20 and it is judged in Step ST24 that the overwrite permission data 236 is written in the program data 231 on the third line, for example, the card reader controller 31A and the overwrite controller 31A perform the following process. In other words, when the overwrite permission data 236 is included in the download file 23A ("Yes" in Step ST24), the overwrite controller 312A of the card reader controller 31A erases the storage area of the identification information (the identification ID) in the identification information storage unit 32A which is a non-volatile memory (Step ST25). In this case, various ways can be considered in that either the card reader controller 31A or the overwrite controller 312A erases the area only when the identification information (the identification ID) is actually stored in the identification information storage unit 32A or that the storage area of the identification information in the identification information storage unit 32A is erased unconditionally (automatically).

Since the overwrite permission data 236 is included in the download file 23, the overwrite controller 312A executes the commands from the second line and the third line of the download file 23A, which are the erase command 233 and the download command 234. Then, the overwrite controller 312A returns to the download controller 21 a normal response indicating that the download command 234 has been normally executed (Step ST26). More specifically, in Step ST26, the overwrite controller 312A erases the program data saved in the firmware storage unit 311 and stores (saves) the program data 231 sent from the host device 20 in the specified area in the firmware storage unit 311A, and then returns a normal response to the download controller 21.

Note that it does not matter which process is performed first, the erasing process in Step ST25 performed on the identification information storage unit 32A or the erasing process in Step ST26 performed on the predetermined area of the firmware storage unit 311A, which is a response to the erase command 233 from the second line of the download file 23A.

Then, the overwrite controller 312A receives the commands from the fourth line on of the download file 23A sequentially (Step ST27) and sequentially executes the download commands 234 on the lines as it has received (Step ST28). In other words, the overwrite controller 312A stores (saves) the program data 231 sent from the host device 20 in the specified area in the firmware storage unit 311A and returns to the download controller 21 a normal response indicating that the download command 234 is normally executed (Step ST28).

On the other hand, as shown in FIG. 3 (B), when the download file 23B is saved in the host device 20 and the overwrite permission data 236 is not written in the program data 231 on the third line, the card reader controller 31A and the overwrite controller 312A perform the following process. In other words, when the overwrite permission data 236 is not included in the download file 23B ("No" in Step ST24), the overwrite controller 312A does not execute the command from the third line of the download file 23B, i.e., the download command 234, but returns to the download controller 21 a normal response indicating (pretending) that the download command 234 is normally executed (Step ST29). More specifically, the overwrite controller 312A returns a normal response to the download controller 21 without storing (saving) the program data 231 sent from the host device 20 in the firmware storage unit 311A.

After this, the overwrite controller 312A sequentially receives the fourth line on of the download file 23B (Step ST30). Next, the overwrite controller 312A judges whether or not the identification information 237 is present (included) in the received download file 23B (Step ST31). When the identification information 237 is included in the download file 23B ("Yes" in Step ST31), the overwrite controller 312A retrieves the identification information (the identification ID) from the received program data 231 (Step ST32) and temporarily holds it in the memory or the registry inside (Step ST33). The identification information 237 of the download file 23B which is retrieved and held here is the identification information of the download file 23B which is invalid to the first card reader 30A.

After the process in Step ST33, or when the identification information 237 is not included in the download file 23B ("No" in Step ST31), the overwrite controller 312A performs a pseudo overwrite process which does not execute the download command 234 from the line which was just received but returns to the download controller 21 a normal response (a pseudo response) indicating (pretending) that the download command 234 is normally executed (Step ST34).

In Step ST 34, the overwrite controller 312A performs the pseudo-overwrite process till the last line of the download file 23B and returns to the download controller 21 a normal response (a pseudo response) indicating (pretending) that the download command 234 is normally executed; then the overwrite controller 312A stores (saves) the invalidated identification information 237 which was temporarily held internally in Step ST33 (Step ST35).

When a request from the host device to send the identification information is received after the process of Step ST35, for example, the card reader controller 31A or the overwrite controller 312A sends to the host device 20 the invalidated identification information which is stored in the identification information storage unit 32A (Step ST37). When the request to send the identification information is not received from the host device in Step ST36 ("No" in Step ST36), the controller does not execute the process of Step ST37 and waits for the next step (command) from the host device 20.

When a request is received from the host device 20 to send the identification information after Step ST28 (Step ST38), the identification information is not stored in the identification information storage unit 32A; then, the card reader controller 31A or the overwrite controller 312A returns to the host device 20 the valid identification information which is written in the normal download file 23A (Step ST39). When there is no request from the host device 20 to send the identification information in Step ST38 ("No" in Step ST38), the controller does not execute the process of Step ST39 and waits for the next step (command) from the host device 20.

Step ST24 of this embodiment is an overwrite permission judging step in which it is judged whether or not the overwrite permission data 236 is included in the download file 23. Also, Step ST26 and Step ST28 of this embodiment are a normal overwriting step in which, when the overwrite permission data 236 is included in the download file 23, the program data 231 sent from the host device 20 overwrites the program data saved in the card reader 30 and a response indicating that the data overwrite has normally been completed is sent to the host device 20. Step ST29 and Step ST34 of this embodiment are a pseudo-overwriting step in which, when the overwrite permission data 236 is not included in the download file 23, the program data 231 sent from the host device 20 does not overwrite the program data saved in the card reader 30 but a response indicating (pretending) a normal completion of the data overwrite is sent to the host device 20. Further, Step ST35 of this embodiment is an identification information storing step in which the identification information 237 of the download file, included in the download file 23, is stored in the identification information storage unit 32 of the card reader 30. Step ST37 of this embodiment is an identification information sending step in which, when a request to send the identification information is received from the host device 20, the identification information stored in the identification information storage portion 32 is sent to the host device 20.

Major Effects of this Embodiment

As described above, according to this embodiment, when the overwrite permission data 236 is included in the download file 23, the program data 231 sent from the host device 20 overwrites the program data saved in the card reader 30. On the other hand, when the overwrite permission data 236 is not included in the download file 23, the program data 231 sent from the host device 20 does not overwrite the program data saved in the card reader 30. In other words, according to this embodiment, when the program data 231 corresponding to the first card reader 30A is saved in the host device 20, the program data 231 sent from the host device 20 overwrites the program data saved in the first card reader 30A. When the program data 231 corresponding to the second card reader 30B is saved in the host device 20, on the other hand, the program data 231 sent from the host device 20 does not overwrite the program data saved in the first card reader 30A. For this reason, the program data 231 corresponding to the second card reader of an old-version 30B is prevented from being downloaded from the host device 20 to the first card reader of a new-version 30A. Therefore, this embodiment can provide a solution to the problem in which the program data 231 corresponding to the old-version, second card reader 30B is downloaded to the first card reader 30A, which in turn may hinder the first card reader 30A from a normal operation.

According to this embodiment, when the overwrite permission data 236 is not included in the download file 23 and therefore the program data 231 sent from the host device 20 does not overwrite the program data saved in the first card reader 30A, i.e., even when the overwrite controller 312 does not execute the erase command 233 and the download command 234, the overwrite controller 312 returns to the host device 20 a response indicating (pretending) that the data overwrite is normally completed. For this reason, even if the program data 231 is not downloaded to the first card reader 30A from the host device 20, the download process at the host device 20 can be ended normally. Therefore, the download system 10 can avoid crashing in this embodiment.

According to this embodiment, when the second card reader 30B is connected to the host device 20, the second card reader 30B overwrites the program data saved in the second card reader 30B with the program data 231 sent from the host device, without judging whether or not the overwrite permission data 236 is included in the download file 23. Therefore, when the program data 231 corresponding to the first card reader 30A is saved in the host device 20, the second card reader 30B can be operated by this program data 231. In other words, according to this embodiment, both the first card reader 30A and the second card reader 30B can be operated by the single program data 231 which corresponds to the first card reader 30A.

Also, when the program data 231 corresponding to the second card reader 30B is saved in the host device 20, this program data 231 is downloaded to the second card reader 30B but not to the first card reader 30A. For this reason, the first card reader 30A can be operated by the program data corresponding to the first card reader 30A and the second card reader 30B can be operated by the program data corresponding to the second card reader 30B as well. Therefore, according to this embodiment, even if only one set of program data 231 is saved in the host device 20, the first card reader 30A and the second card reader 30B are properly operated.

Thus, according to this embodiment, even if only one set of program data 231 is saved in the host device 20, the first card reader 30A and the second card reader 30B can properly be operated. For this reason, there is no need to change the host device 20 depending on which card reader, the first card reader 30A or the second card reader 30B, is connected to the host device 20. Therefore, in this embodiment, usability for users that use the download system 10 can be increased.

Further, according to this embodiment, the identification information (the identification ID) 237, besides the overwrite permission data 236, is written in the program data 231 in the download file 23, and the card reader controller 31 performs the following controls in the card reader 30 at the time of downloading the download file. More specifically described, when receiving the downloadable, old-version download file, the controller 31 not only returns to the host device 20 a pseudo response indicating (pretending) that the command is normally received, but also retrieves the invalidated identification information 237 from the received data and holds it in the identification information storage unit 32 such as a nonvolatile memory in the card reader 30 which is a peripheral device. Then, when the invalidated identification information is saved in the identification information storage unit 32, the card reader controller 31 sends the invalidated identification information as the identification information to the host device 20, responding to the request from the host device 20 to send the identification information. When normally receiving a new-version download file, the controller 31 erases the storage area of the invalidated identification information in the identification information storage unit 32. In other words, if the storage area of the invalid identification information has already been erased at the time of start-up, the normal (valid) identification information is sent to the host device 20 responding to the request from the host device 20 to send the identification information.

Therefore, according to this embodiment, the following effects can further be obtained. More specifically described, the controller not only pretends to overwrite with the sent download file 23, performing a pseudo-overwrite, and returns a normal response even when the host device has not been updated with a new-version download file, but also sends the identification information (the identification ID) of the download file on which the pseudo-overwrite is performed when the host device 20 sends a request to send the identification information (the identification ID); therefore, no download process is performed after that, shortening the processing time. When the request is received from the host device 20 to send the identification information (the identification ID), the identification information (the identification ID) of the download file on which the pseudo-overwrite has been performed is returned even immediately after the download; therefore, the system is prevented from going down. Since the instruction to apply the inapplicable download file is removed from the host device 20, its operation environment can be protected and a continual use is made possible.

Further, according to this embodiment, when the identification information is not present in the predetermined location in the received download file 23, the host device 20 sends the recognizable identification information of the download file 23 to the card reader 30 which is a peripheral device, using a new send-command. The card reader 30 stores (saves) and holds the identification information received through the new command in the identification information storage unit 32 such as a non-volatile memory. In this embodiment, the identification information (the ID for identification) is basically positioned in the predetermined location in the download file; however, the identification information is not always positioned in the same location in other peripheral devices, and therefore, the embodiment can be adopted for such a case.

<Modification Example of Download File and Download Method>

Figure 6:
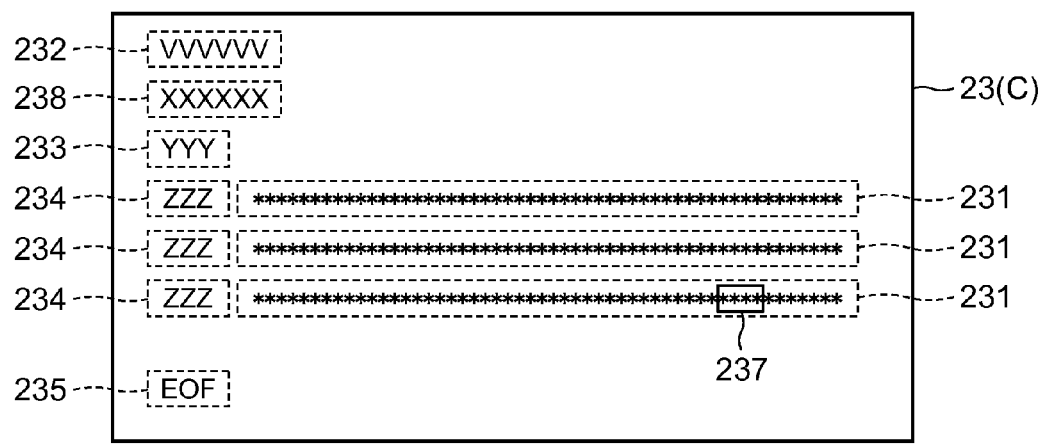
[FIG. 6] A configuration diagram showing an example of a data structure of a download file of another embodiment of the present invention.

Next, a modification example of the download file and the download method is described as another embodiment. FIG. 6 is a conceptual diagram showing an example of the data structure of the download file 23 of another embodiment of the present invention.

In the above-described embodiment, as shown in FIG. 2, the download file 23 does not include the certify-overwriting command 238 used for judging whether it is ok to overwrite the program data saved in the card reader 30 with the program data 231 saved in the host device 20. On the other hand, in this other embodiment, the certify-overwriting command 238 may be included in the download file 23(C) as shown in FIG. 6. In the example of FIG. 6, the overwrite permission data 236 is not written in the program data 231. In this case, for example, the overwrite permission data is attached to the certify-overwriting command 238 to let the overwrite controller 312 in the card reader 30 allow the program data 231 saved in the external storage unit 22 to overwrite the program data 231 saved in the card reader 30. Also, the overwrite permission data attached to the certify-overwriting command 238 in the download file 23A which corresponds to the first card reader 30A is different from the overwrite certification data attached to the certify-overwriting command 238 in the download file 23B which corresponds to the second card reader 30B.

In the download file 23(C) of this modification example as shown in FIG. 6, the certify-overwriting command 238 is written on the second line, the erase command 233 is written on the third line and the download commands 234 and the program data 231 are written on the fourth line on of the download file 23(C). Saved in the overwrite controller 231A is the permission data which is identified as the overwrite permission data attached to the certify-overwriting command 238 of the download file 23A or which corresponds to this overwrite permission data one-to-one. Saved in the overwrite controller 312B is the permission data which agrees with the overwrite permission data attached to the certify-overwriting command 238 in the download file 23B or which corresponds to the overwrite permission data one-to-one.

<More Specific Control Process of Download at Card Reader 30 of Another Embodiment>

[Normal Process (not in Another Embodiment)>

Normally, the "certify" command is first executed for an overwrite (write) certification; when the certification is obtained, the overwrite area in the firmware storage portion 311 in which the program data is stored is erased upon receiving the "erase" command, and the writing is performed upon receiving the "download" command.

Process of Another Embodiment

In another embodiment, the process by (1) through (6) below is performed.

(1) When the overwrite (write) certification is obtained by the "certify" command (in case of a normal overwrite), the overwrite area in the firmware storage portion 311, in which the program data is stored, is erased when the "erase" command is received, and also the identification information in the identification information storage unit 32 such as a non-volatile memory is erased, and then the writing of the program data is performed by the next "download" command".

(2) When not only the overwrite (write) certification is not obtained by the "certify" command but also the card reader controller 31 judges that the file specifies an old-version product (a card reader of an old-version), it is judged that the download file should not overwrite, and the overwrite is not performed by the next "erase" or "download" command but a normal response is only returned. In other words, the process responding to the commands is not performed, but a pseudo-overwrite is performed.

(3) In this pseudo-overwrite process, the identification information (the identification ID) inherent in the predetermined location in the received download file 23 is retrieved and held inside temporarily.

(4) This pseudo-overwrite process pretends a normal download until the end. When the process reaches the end, the temporarily-held identification information (the identification ID) is stored (saved) in the identification information storage unit 32 such as a non-volatile memory.

(5) If it is discovered after the download that the identification information (the identification ID) is recorded in the identification information storage unit 32 such as a non-volatile memory, this identification information (the identification ID) is returned as a response.

(6) When the overwrite certification cannot be obtained by the "certify" command and the download file is not for the old-version machine, an abnormal response is returned to the host device 20.

<Firmware Download Process in Another Embodiment: Process at Card Reader>

Figure 7:
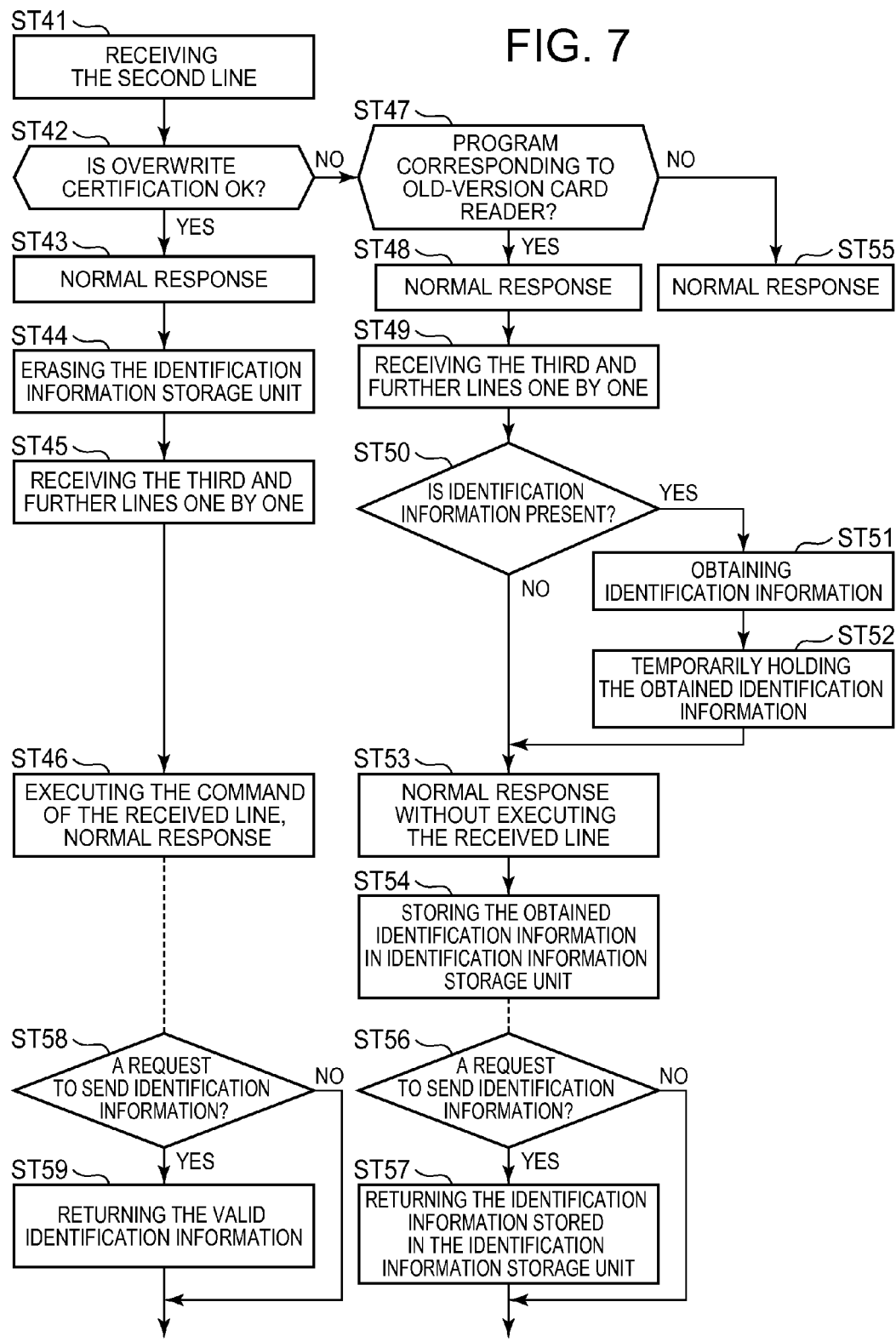
[FIG. 7] A flowchart of an example of a process flow of the firmware download at a card reader of another embodiment of the present invention.

The download process at the card reader 30 which is a peripheral device of another embodiment of the present invention is next described referring to FIG. 7. FIG. 7 is a flowchart showing an example of the process flow at the time of the firmware download at the card reader 30 of another embodiment of the present invention.

In the modification example of this other embodiment, as shown in FIG. 7, the card reader controller 31A and the overwrite controller 312A receive the second line of the download file 23 which is issued in the above-described Step ST9 (FIG. 4), i.e., the certify-overwriting command 238 (Step ST41). The overwrite controller 312A judges whether or not the overwrite permission data attached to the certify-overwriting command 238 agrees with (or corresponds to) the permission data saved in the overwrite controller 312A (Step ST42). In other words, the overwrite controller 312A judges whether or not the overwrite certification can be obtained in Step ST42.

When the download file 23A is saved in the host device 20 and the overwrite certification can be obtained in Step ST42 ("Yes" in Step ST42), the card reader controller 31A and the overwrite controller 312A return to the download controller 21 a normal response indicating that the overwrite certification is obtained (Step ST43). Upon obtaining the overwrite certification and returning the normal response, the card reader controller 31A and the overwrite controller 312A perform the following process. In other words, the card reader controller 31A and the overwrite controller 312A erase the identification information (the identification ID) storage area in the identification information storage unit 32A which is a non-volatile memory (Step ST44). Even in this case, it is possible to configure that the card reader controller 31A or the overwrite controller 312A erases the identification information storage area when the identification information (the identification ID) is actually stored in the identification information storage unit 32A or erases the identification information storage area in the identification information storage unit 32A unconditionally (automatically).

Next, the overwrite controller 312A executes the commands on the third line and the fourth line in the received download file 23A, i.e., the erase command 233 and the download command 234. Then, the overwrite controller 312A returns to the download controller 21A a normal response indicating that the download command 234 has been normally executed (Step ST45). More specifically, the overwrite controller 312A erases the program data saved in the firmware storage unit 311A, and stores the program data 231 sent from the host device 20 in the specified area in the firmware storage unit 311A, and returns a normal response to the download controller 21.

Note that it does not matter which process comes first, the erasing process on the identification information storage unit 32A in Step ST44 or the erasing process on a predetermined area in the firmware storage unit 311A which responds to the erase command 233 from the third line in the download file 23A in Step ST45.

Then, the overwrite controller 312A receives the data on the fifth line on of the download file 23A sequentially (Step ST45) and executes the download command 234 one after another as received (Step ST46). In other words, the overwrite controller 312A stores (saves) the program data 231 sent from the host device 20 in the specified area in the firmware storage portion 311A and returns to the download controller 21 a normal response indicating that the download command 234 has normally been executed (Step ST46).

On the other hand, when the overwrite certification cannot be obtained in Step ST42 ("No" in Step ST42), the overwrite controller 312A performs the following process. The overwrite controller 312A judges whether the overwrite permission data attached to the certify-overwriting command 238 is the overwrite permission data attached to the certify-overwriting command 238 in the download file 23B or the overwrite permission data attached to the certify-overwriting command in a download file such as a card reader of different type (Step ST47). In other words, the overwrite controller 312A judges whether the program data saved in the host device 20 corresponds to the old-version, second card reader 30B or corresponds to a card reader of different type in Step ST47.

When it is judged in Step ST47 that the program data saved in the host device 20 corresponds to the second card reader 30B, that is, when the download file 23B is saved in the host device 20 ("Yes" in Step ST47), the overwrite controller 312A returns to the download controller 21 a normal response indicating (pretending) that the overwrite certification is obtained, despite the fact that the overwrite certification is not obtained (Step ST48). After this, the overwrite controller 312A receives the data on the third line on in the download file 23B sequentially (Step ST49).

Next, the overwrite controller 312A judges whether or not the identification information 237 is present in the received download file 23B (Step ST50). When the identification information 237 is included in the download file 23B ("Yes" in Step ST50), the overwrite controller 312A retrieves the identification information (the identification ID) 237 from the received program data 231 (Step ST51) and temporarily holds it in the memory or registry inside (Step ST52). The identification information of the download file 23B which is retrieved and held here is the identification information of the download file which is invalid to the first card reader 30A.

After the process of Step ST 52 or when the identification information 237 is not included in the download file 23B ("No" in Step ST50), the overwrite controller 312A does not execute the download command 234 which it has just received, but performs a pseudo-overwriting process and returns to the download controller 21 a normal response (a pseudo response) indicating (pretending) that the download command 234 has normally been executed (Step ST53).

After performing the pseudo-overwriting process on the data on the last line of the download file 23B and returning to the download controller 21 a normal response (a pseudo response) indicating (pretending) that the download command 234 has normally been executed in Step ST53, the overwrite controller 312A stores (saves) the invalidated identification information 237, which is temporarily held internally in Step ST 52, in the identification information storage unit 32A (Step ST54).

When it is judged in Step ST47 that the program data saved in the host device 20 corresponds to a card reader of a different type ("No" in Step ST47), the overwrite controller 312A returns an abnormal response to the download controller 21 (Step ST55). Upon receiving the abnormal response, the download controller 21 judges it as a failure of downloading the program data 231 and ends the download process.

Also, when a request is received from the host device 20 to send the identification information after the process of Step ST54 (Step ST56), the card reader controller 31A or the overwrite controller 312A returns to the host device 20 the identification information which is stored in the identification information storage unit 32A (Step ST57). Also, when there is no request from the host device 20 in Step ST56 ("No" in Step ST56), the controller does not execute the process of Step ST57 and waits for the next step command from the host device 20.

At the time when a request is received from the host device to send the identification information after the process of Step ST46 (Step ST58), the identification information is not stored in the identification information storage portion 32A; then, the card reader controller 31A or the overwrite controller 312A returns to the host device 20 the valid identification information written in the normal download file 23A (Step ST59). Also, when there is no request from the host device 20 in Step ST58 ("No" in Step ST58), the controller does not execute the process of Step ST59 and waits for the next step command from the host device 20 is waited.

Even in this modification example, the same effects as the above-described embodiment can be obtained. In this modification example, there is no need to include the overwrite permission data 236 in the program data 231; therefore, the structure of the program data 231 can partially be simplified. Note that, when the overwrite permission data 236 is included in the program data 231, it is possible to judge whether or not the overwrite permission data is included in the download file 23 even when the certify-overwriting command 238 is not included in the download file 23 or even when the certify-overwriting command 238 is not accepted by the card reader 30.

In this other embodiment of the present invention, the same effects as the aforementioned embodiment can be obtained by performing the download process which uses the certify-overwriting command and the identification information. In other words, even when the host device is not replaced by the download file with a new specification, not only is a pseudo-overwrite performed on the sent download file, but also the identification information (the identification ID) of the pseudo-overwritten, invalidated download file is returned when a request is received from the host device 20 to send the identification information (the identification ID); therefore, no further download process is executed, thus shortening the process. When a request is received from the host device 20 to send the identification information (the identification ID), the identification information (the identification ID) of the pseudo-overwritten download file is returned even right after the download; therefore, the system is prevented from going down. Since the instruction to apply the inapplicable download file is removed from the host device, its operation environment is protected, allowing the continual use of the device.

Note that Step ST42 in this modification example is the overwrite permission judging step for judging whether or not the overwrite permission data, which lets the overwrite controller 312A allow the program data 231 saved in the host device 20 to overwrite the program data saved in the first card reader 30A, is included in the download file 23(C). Also, Step ST46 is the normal overwriting step; when the overwrite permission data, which lets the overwrite controller 312A allow the program data 231 saved in the host device 20 to overwrite the program data saved in the first card reader 30A, is included in the download file 23(C), Step ST46 overwrites the program data saved in the first card reader 30A with the program data 231 sent from the host device 20 and returns to the host device 20 a response indicating that the normal data overwrite has been completed. Further, Step ST53 is the pseudo-overwriting step; when the download file 23(C) does not include the overwrite permission data, which lets the overwrite controller 312A allow the program data 231 saved in the host device 20 to overwrite the program data saved in the first card reader 30A, Step ST53 does not overwrite with the program data 231 sent from the host device 20 and returns to the host device 20 a response indicating (pretending) the normal data overwrite is completed. Furthermore, Step ST54 of this embodiment is the identification information storing step in which the identification information 237 of the download file 23(C) included in this download file is stored in the identification information storage unit 32 of the card reader 30. Step ST57 is the identification information sending step in which, when a request is received from the host device 20 to send the identification information, the identification information stored in the identification information storage unit 32 is sent to the host device 20.

Other Embodiment

The above-described embodiment and modification example are examples of the embodiments of the present invention; however, the present invention is not limited to these, but those embodiments can be varyingly modified within the scope of the present invention.

Figure 8:
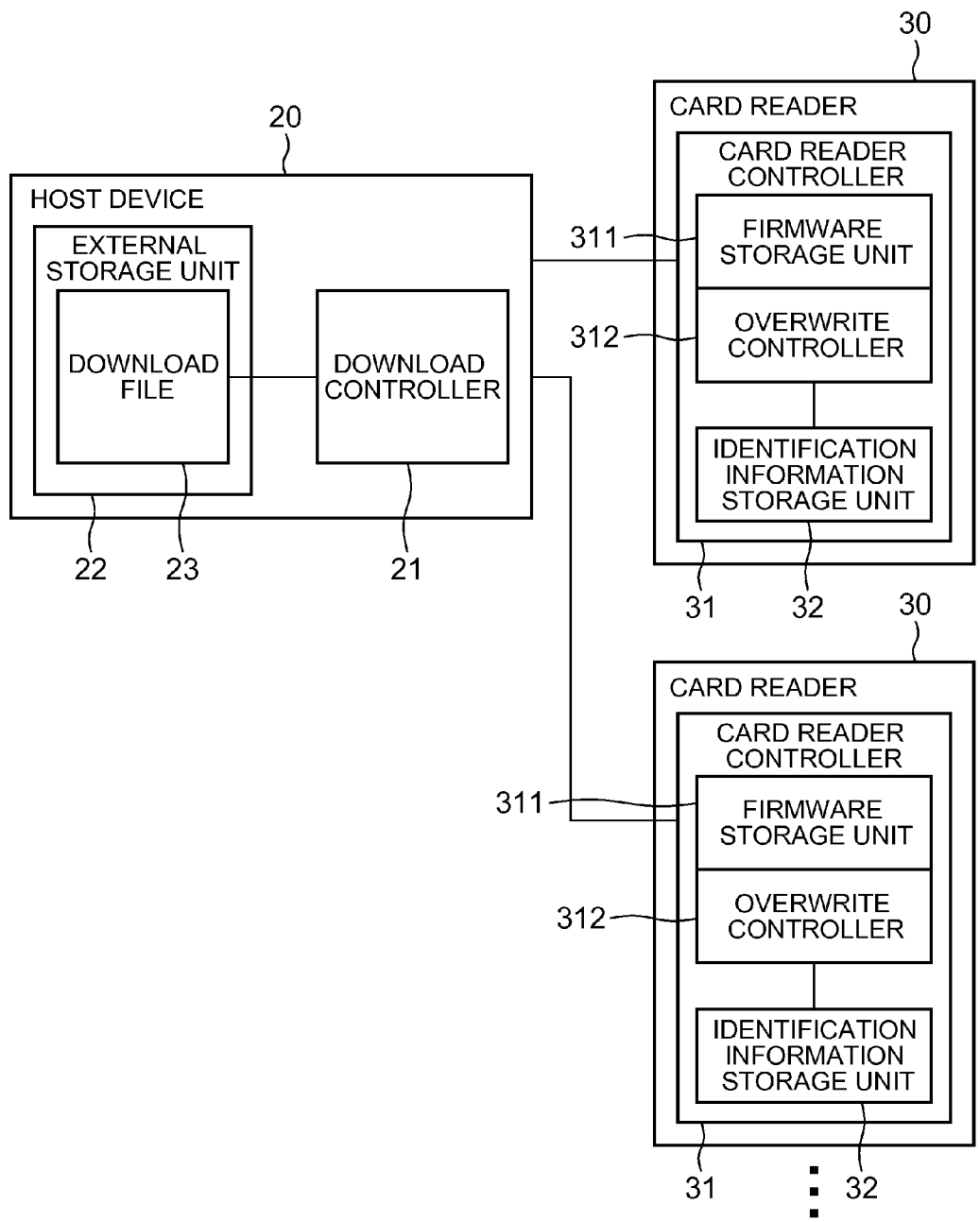
[FIG. 8] A block diagram showing a configuration of a download system of the firmware of another embodiment of the present invention.

In the above-described embodiment, one card reader 30 (30A or 30B) is connected to the host device 20. As another embodiment as shown in FIG. 8, multiple card readers 30 of the same type can be connected in parallel to the host device 20, and the program data 231 of the firmware to operate each card reader 30, which is a peripheral device, may be downloaded from the host device to each card reader 30.

Figure 9:
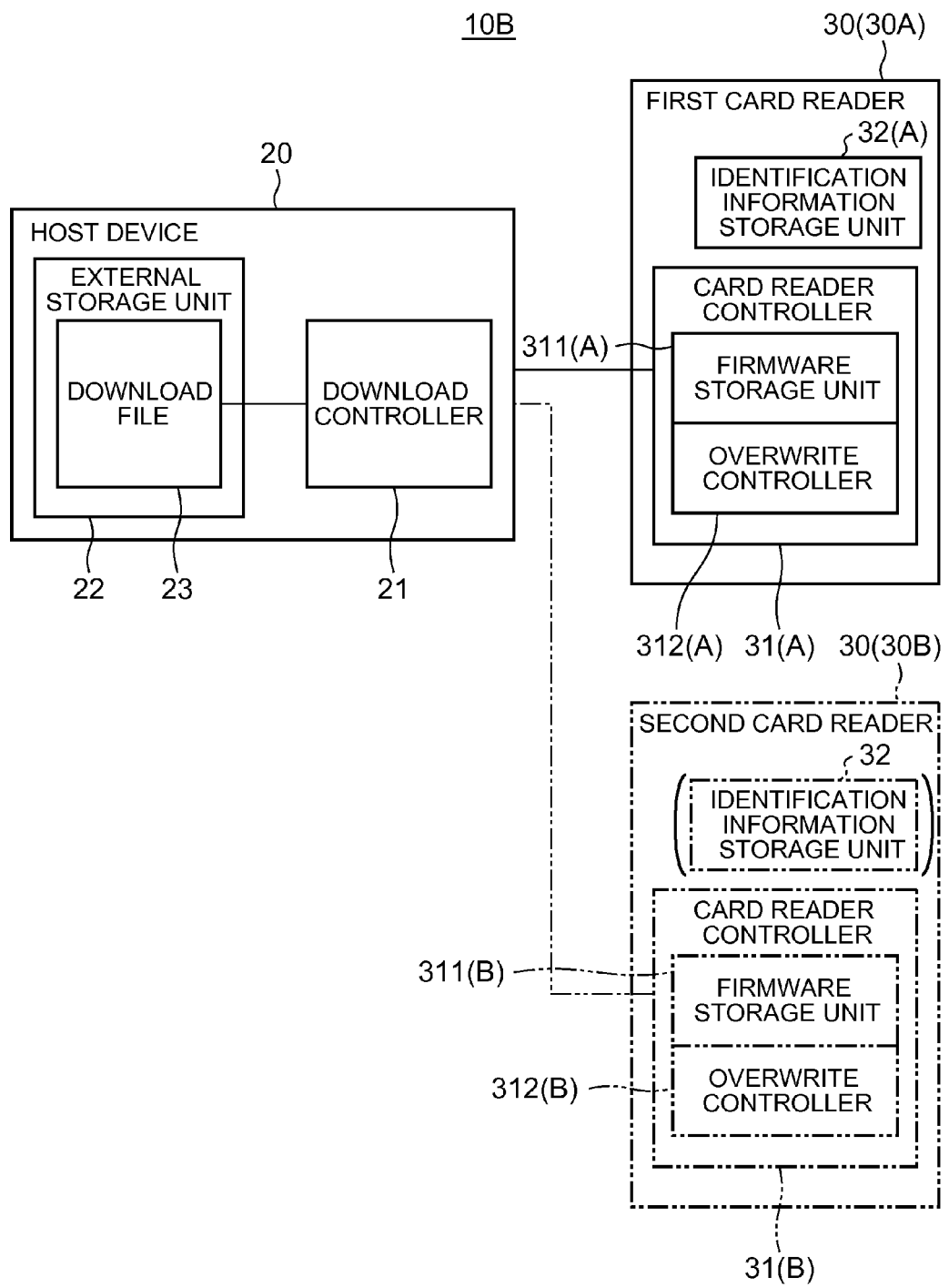
[FIG. 9] A block diagram of a configuration of a firmware download system of still another embodiment of the present invention.

Also, in the above-described embodiment, it is configured to include the identification information storage unit 32 in the card reader controller 31. However, as another embodiment as shown in FIG. 9, it may be configured to arrange the identification information storage unit 32 outside the card reader controller 31. In this case, the identification information storage unit 32 can be accessed in various ways such as the card reader controller 31 directly accesses it, the overwrite controller 312 accesses it, etc. Note that although FIG. 9 shows another embodiment corresponding to the configuration of FIG. 1, the identification information storage unit 32 can be arranged outside the card reader controller 31 as shown by parentheses in FIG. 9 in the same manner even in the case corresponding to FIG. 8.

In the above-described embodiment, the overwrite permission data 236 is written in the program data 231 on the third line of the download file 23A. Beside this, the overwrite permission data 236 may be written in the program data 231 on the n-th line after the fourth line in the download file 23A, for example. In this case, the overwrite controller 312 first judges whether or not the overwrite permission data 236 is written in the program data 231 on the n-th line, and then either executes the commands from the second line to the n-th line and returns a normal response to the download controller 21, or returns a normal response to the download controller 21 without executing the commands from the second line to the n-th line.

In this embodiment, roughly two kinds of download file formats are used for the identification information as shown in FIG. 2 and FIG. 6. Basically, the revision information (the revision header) on the head line is the information for the host device and therefore, is not sent to the peripheral device. In this embodiment, the means to judge whether or not the download file is legitimate by the overwrite permission data inside the download file or the presence of the "certify" command, changes; however, if the [peripheral device] does not accept the "certify" command, the overwrite permission data (the certification ID) and the identification information (the identification ID) is included in the program data. Even if the overwrite permission data corresponding to the "certify" command is written, the download is not immediately disabled, but the identification information (the identification ID) is retrieved during the pseudo-overwriting which actually executes the command only when it is judged as the old-version peripheral device. For an application example, which may have already been stated, the identification information (the identification ID) may be written in cipher or in text. Although described before as well, the revision header on the head line may be issued as a command and sent as a send-identification-ID command. In this embodiment, the identification information (the identification ID) is positioned in a predetermined location in the download file; however, it is not always positioned in the same location throughout other peripheral devices. Therefore, it is possible that the identification information (the identification ID) which is not sent to the peripheral device in the current situation is written in a text format and a notify-identification-ID command is newly provided; only when the download controller 21 normally receives this (notify-identification-ID) command, the process to create such a send-(identification-ID) command using the notify-command is performed to realize the certification.

Further, the above-described embodiment was described using the example in which the revision information (the revision header) 232 and the identification information (the ID for identification) 237 use the same data; however, they may not use the same data, but the data (the volume) of the identification information (the identification ID) may generally be more than that of the revision information 232, being written in more detail.

In the above-described embodiment, the peripheral device communicably connected to the host device 20, that is the second peripheral device, is the card reader 30; however, it may be various kinds of devices other than the card reader 30, such as a printer.

Note that the method described in detail above can be configured as a program that follows the above steps and is executed by a computer such as a CPU. Also, such a program may be configured such that it is accessed and executed through a recording medium such as a semiconductor memory, a magnetic disk, an optical disk, a floppy (registered trademark) disk or a computer having the recording medium installed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A peripheral device which is connected to a host device, and to which a download file including firmware program data to operate said peripheral device can be downloaded from said host device, the peripheral device comprising:
an identification information storage unit in which identification information of said download file can be stored;
a program storage unit in which at least program data is stored and is over-writable; and
a controller which controls overwriting of said program data stored in said program storage unit;
wherein said download file includes at least said identification information of said download file or both said identification information of said download file and overwrite permission data to allow said controller to overwrite the program data stored in said program storage unit;
when said overwrite permission data is included in said download file, said controller, as a normal overwrite, overwrites said program data saved in said program storage unit with said program data sent from said host device and returns a response indicating a normal completion of said data overwrite;
when said overwrite permission is not included in said download file, said controller, as a pseudo-overwrite, returns a response of a normal completion of said data overwrite without overwriting said program data stored in said program storage unit with said program data sent from said host device; and
said identification information of said download file is stored in said identification information storage unit.

2. The peripheral device as set forth in claim 1 wherein said controller retrieves the identification information included in said download file and stores it in said identification information storage unit.

3. The peripheral device as set forth in claim 1 wherein when a request is received from said host device to send said identification information, said controller returns said identification information which is stored in said identification information storage unit.

4. The peripheral device as set forth in claim 1 wherein when receiving said download file normally, said controller disables a retrieval of said identification information stored in said identification information storage unit.

5. The peripheral device as set forth in claim 1 wherein said identification information is written in a predetermined location in the program data in said download file.

6. The peripheral device as set forth in claim 1 wherein when the identification information is not included in said download file which has been received, said controller can receive a new command as identification information from said host device.

7. A method of controlling a peripheral device which is connected to a host device, and to which a download file including firmware program data to operate said peripheral device can be downloaded from said host device, the method comprising:
judging whether or not overwrite permission data, which allows said program data saved in said host device to overwrite said program data saved in said peripheral device, is included in said download file downloaded from said host device;
when it is judged that said overwrite permission data is included in said download file, overwriting said program data saved in said peripheral device with said program data sent from said host device and returning a response indicating a normal completion of the data overwrite to said host device;
when it is judged that said overwrite permission data is not included in said download file, returning a response falsely indicating a normal completion of the data overwrite to said host device without overwriting said program data saved in said peripheral device with said program data sent from said host device;
storing the identification information of said download file, included in said download file, in an identification information storage unit of said peripheral device; and when a request is received from said host device to send said identification information, returning said identification information stored in said identification information storage to said host device.

8. The method of controlling a peripheral device, as set forth in claim 7, wherein said storing the identification information is performed parallel to said returning a response falsely indicating a normal completion.

9. The method of controlling a peripheral device, as set forth in claim 7, wherein said overwriting said program data comprises disabling the retrieval of the identification information stored in said identification information storage unit when said download file is normally received.

10. The method of controlling a peripheral device, as set forth in claim 7, wherein said identification information is written in a predetermined location in program data of said download file.

11. The method of controlling a peripheral device, as set forth in claim 7, wherein when the identification information is not included in said download file which has been received, a new command can be received as identification information from said host device.

12. A firmware download system, comprising:
   at least one peripheral device; and
   a host device to which said peripheral device is connected and which can download a download file including firmware program data, which operates said peripheral device, to said peripheral device;
   wherein said peripheral device comprises:
      an identification information storage unit in which identification information of said download file can be stored; and
      a program storage unit in which at least program data is stored and is overwritable;
      a controller which controls overwriting of said program data stored in said program storage unit;
      wherein said download file includes at least said identification information of said download file or both said identification information of said download file and overwrite permission data to allow said controller to overwrite the program data stored in said program storage unit;
      wherein when said overwrite permission data is included in said download file, said controller, as a normal overwrite, overwrites said program data saved in said program storage unit with said program data sent from said host device and returns a response indicating a normal completion of said data overwrite;
      when said overwrite permission is not included in said download file, said controller, as a pseudo-overwrite, returns a response of a normal completion of said data overwrite without overwriting said program data stored in said program storage unit with said program data sent from said host device; and
      said identification information of said download file is stored in said identification information storage unit.

13. A non-transitory computer-readable medium storing instructions that, when executed by a computer, causes the computer to execute a control process of a peripheral device which is connected to a host device and to which a download file including firmware program data to operate said peripheral device can be downloaded from said host device, and causing the computer to perform: judging whether or not overwrite permission data, which allows said program data saved in said host device to overwrite said program data saved in said peripheral device, is included in said download file downloaded from said host device; when it is judged that said overwrite permission data is included in said download file, overwriting said program data saved in said peripheral device with said program data sent from said host device and returning to said host device a response indicating a normal completion of the data overwrite; when it is judged that said overwrite permission data is not included in said download file, returning a response falsely indicating a normal completion of the data overwrite without overwriting said program data saved in said peripheral device with said program data sent from said host device; storing the identification information of said download file, which is included in said download file, in an identification information storage unit of said peripheral device; and when a request is received from said host device to send said identification information, returning to said host device said identification information stored in said identification information storage unit.

* * * * *